US010387682B2

(12) United States Patent
Kalafala et al.

(10) Patent No.: US 10,387,682 B2
(45) Date of Patent: Aug. 20, 2019

(54) PARALLEL ACCESS TO RUNNING ELECTRONIC DESIGN AUTOMATION (EDA) APPLICATION

(71) Applicant: INTERNATIONAL BUSINESS MACHINES CORPORATION, Armonk, NY (US)

(72) Inventors: Kerim Kalafala, Rhinebeck, NY (US); Douglas Keller, Lagrangeville, NY (US); Debjit Sinha, Wappingers Falls, NY (US); Richard W. Taggart, Poughkeepsie, NY (US); Natesan Venkateswaran, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 15/616,961

(22) Filed: Jun. 8, 2017

(65) Prior Publication Data

US 2018/0357433 A1    Dec. 13, 2018

(51) Int. Cl.
*G06F 17/50* (2006.01)
*G06F 21/62* (2013.01)
*G06F 21/31* (2013.01)
*H04L 29/06* (2006.01)

(52) U.S. Cl.
CPC ........ *G06F 21/629* (2013.01); *G06F 17/5045* (2013.01); *G06F 21/31* (2013.01); *H04L 63/08* (2013.01); *H04L 63/102* (2013.01)

(58) Field of Classification Search
CPC .... G06F 21/629; G06F 17/5045; G06F 21/31; H04L 63/08; H04L 63/102
See application file for complete search history.

(56) References Cited

U.S. PATENT DOCUMENTS 5,978,476 A * 11/1999 Redman ................. G06F 21/10
                                                                345/468
5,983,277 A    11/1999 Heile et al.
6,321,369 B1   11/2001 Heile et al.
(Continued)

OTHER PUBLICATIONS

IBM: List of IBM Patents or Patent Applications Treated as Related (Appendix P), Mar. 30, 2018, pp. 1-2.
(Continued)

*Primary Examiner* — Oleg Korsak
(74) *Attorney, Agent, or Firm* — Michael A. Petrocelli

(57) ABSTRACT

Embodiments of the present invention disclose a method, computer program product, and system for parallel access to an electronic design automation (EDA) application. The computer receives a request to access an electronic design automation (EDA) application from at least two user computing device and authenticates a user associated with each of the requests from the at least two user computing devices to access the EDA application. The computer determines a level of access to be granted to each of the user of the at least two user computing devices and creates a parallel connection to each of the at least user computing device based on the determined level of access granted to each of the users. The computer retrieves data to be transmitted to each of the at least user computing device to be displayed on each of the user computing devices and stores the data in a memory unit.

15 Claims, 6 Drawing Sheets

(56) References Cited

U.S. PATENT DOCUMENTS

| | | | |
|---|---|---|---|
| 6,341,361 | B1 | 1/2002 | Basto et al. |
| 6,578,174 | B2 | 6/2003 | Zizzo |
| 6,594,799 | B1 | 7/2003 | Robertson et al. |
| 7,418,683 | B1 | 8/2008 | Sonnard et al. |
| 7,546,571 | B2 | 6/2009 | Mankin et al. |
| 8,302,039 | B2 | 10/2012 | Ferguson et al. |
| 8,438,530 | B2 | 5/2013 | Giffel |
| 8,630,829 | B1 | 1/2014 | Gaudette et al. |
| 8,713,519 | B2 | 4/2014 | Lininger |
| 8,875,087 | B1 | 10/2014 | Li et al. |
| 9,009,632 | B2 | 4/2015 | Dai et al. |
| 9,268,898 | B1 | 2/2016 | Frost et al. |
| 9,323,871 | B2 | 4/2016 | Lininger |
| 9,619,608 | B1 | 4/2017 | Bernard et al. |
| 9,684,750 | B1 | 6/2017 | Bernard et al. |
| 9,684,752 | B2 | 6/2017 | Harper et al. |
| 9,721,052 | B1 | 8/2017 | Bernard et al. |
| 9,734,273 | B2 | 8/2017 | McCallum et al. |
| 9,939,880 | B1 | 4/2018 | Foreman et al. |
| 2003/0065488 | A1 | 4/2003 | Beckert et al. |
| 2003/0131332 | A1 | 7/2003 | Pfeil et al. |
| 2004/0221179 | A1 | 11/2004 | Seshadri |
| 2005/0160396 | A1 | 7/2005 | Chadzynski |
| 2006/0095882 | A1 | 5/2006 | Mankin et al. |
| 2006/0101368 | A1 | 5/2006 | Kesarwani et al. |
| 2006/0110837 | A1 | 5/2006 | Gupta et al. |
| 2009/0106002 | A1 | 4/2009 | Viswanathan et al. |
| 2009/0222927 | A1 | 9/2009 | Pikus |
| 2010/0199240 | A1* | 8/2010 | Pfeil .................. G06F 17/50 716/137 |
| 2010/0235795 | A1 | 9/2010 | Potemski et al. |
| 2011/0016444 | A1 | 1/2011 | Paris et al. |
| 2012/0290616 | A1 | 11/2012 | Lee |
| 2014/0278269 | A1 | 9/2014 | Winn et al. |
| 2015/0213407 | A1 | 7/2015 | Cabler et al. |
| 2016/0232264 | A1 | 8/2016 | Oh et al. |
| 2016/0246899 | A1 | 8/2016 | Hirschtick et al. |
| 2016/0364506 | A1 | 12/2016 | Harper et al. |
| 2017/0024508 | A1 | 1/2017 | Mneimneh et al. |

OTHER PUBLICATIONS

Pending U.S. Appl. No. 15/900,886, filed Feb. 21, 201, entitled "Parallel Access to Running EDA Application", pp. 1-31.

Stokes, E., Byrne, D., Blakley, B. and Behera, P., 2000. Access Control Requirements for LDAP (No. RFC 2820). (Year: 2000).

Wahl, M., Howes, T. and Kille, S., 1997. Lightweight directory access protocol (v3) (No. RFC 2251). (Year: 1997).

Kostienko et al., "An advanced infrastructure for collaborative engineering in electronic design automation", Conference Paper, Jan. 2003, ISPE CE, pp. 703-710.

Kashif et al., "Signal Integrity Problems in Electronic Designing", 2015 Asia-Pacific Microwave Conference, Dec. 6-9, 2015, (APMC 2015), vol. 2, pp. 1-3.

Napster, "Forking vs. Threading", Geek Ride, Jan. 11, 2010, pp. 1-4, http://www.geekride.com/fork-forking-vs-threading-thread-linux-kernel/.

Moyer, "Silicon Cloud, IBM Give It a Go", Journal of Electronic Engineering, Cloud EDA Round 2, Aug. 3, 2015, 7 pages.

Opentext, Connectivity Solutions, "EDA Cloud Computing", printed Apr. 18, 2017, 2 pages, http://connectivity.opentext.com/solutions/eda-cloud-computing.aspx.

Armbrust et al., "Above the Clouds: A Berkeley View of Cloud Computing", Electrical Engineering and Computer Sciences, University of California at Berkeley Technical Report No. UCB/EECS-2009-28, Feb. 10, 2009, pp. 1-23, https://www2.eecs.berkeley.edu/Pubs/TechRpts/2009/EECS-2009-28.html.

Merriman, "IBM releases IoT electronic design automation tools in the SoftLayer cloud", Tools allow scalable Internet of Things chip design, Jun. 9, 2015, 4 pages, https://www.theinquirer.net/inquirer/news/2412304/ibm-releases-iot-electronic-design-automation-tools-in-the-softlayer-cloud.

Kazmierski et al., "A two-tier distributed electronic design framework", Proceedings of the 2002 Design, Automation and Test in Europe Conference and Exhibition (Date '02), 2002 IEEE, 5 pages.

Electronic Engineering Journal, "Silicon Cloud Integrates StarNet's FastX with Industry's First Cloud-based IC Design Platform", Browser-based Linux Display Tool Helps Pioneer Cloud Design, Jun. 8, 2015, 3 pages.

Silicon Cloud International, Technology Overview, printed Apr. 18, 2017, 3 pages, https://siliconcloudinternational.com/technology-overview/.

Kang et al., Abstract for "Web-Based Electronic Design Automation Circuit Design and Part Management System Development", Jan. 2008, 3 pages.

Mell et al., "The NIST Definition of Cloud Computing" Recommendations of the National Institute of Standards and Technology, Special Publication 800-145, Sep. 2011, 7 pages.

Nyamsuren et al., "A web-based collaborative framework for facilitating decision making on a 3D design developing process", Journal of Computational Design and Engineering, vol. 2, (2015), pp. 148-156.

Kazmierski et al., "A Secure Web-based Framework for Electronic System Level Design", Proceedings of the Design, Automation and Test in Europe Conference and Exhibition (Date'03), 2003 IEEE, 2 pages.

* cited by examiner

PARALLEL ACCESS TO RUNNING ELECTRONIC DESIGN AUTOMATION (EDA) APPLICATION

BACKGROUND

The present invention relates generally to the field of accessing an application via the internet, and more particularly to a plurality of users accessing an application in parallel with each other.

Electronic Design Automation (EDA) applications span several facets of chip design including, but not limited to, logic synthesis, functional verification, physical synthesis, design closure, analysis (timing, power, signal integrity), and checking. Present day microprocessor and other ASIC chip designs are very large and complex, which is exacerbated by constraints posted by deep submicron technologies. To handle the underlying complexity, EDA applications are typically run on high performing servers that have significant storage capacity. In such an environment, designers have two primary ways of ingesting the results of their runs; either through interacting with live runs, or through results written to databases/output files. Either of these approaches comes with certain limitations. For instance, with the live run option, the end user (a designer, for instance) may not be able to get significant analysis outside of the features available natively in the tool. Furthermore, the interactive sessions are limited to one user model, thus making it impossible for multiple users to analyze different aspects of the run simultaneously. The reports have similar limitations because of pre-fixed formats, and databases usually need expertise from people who need to query the data contained thereof.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for parallel access to an electronic design automation (EDA) application. The computer receives a request to access an electronic design automation (EDA) application from at least two user computing device and authenticates a user associated with each of the requests from the at least two user computing devices to access the EDA application. The computer determines a level of access to be granted to each of the user of the at least two user computing devices and creates a parallel connection to each of the at least user computing device based on the determined level of access granted to each of the users. The computer retrieves data to be transmitted to each of the at least user computing device to be displayed on each of the user computing devices and stores the data in a memory unit.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
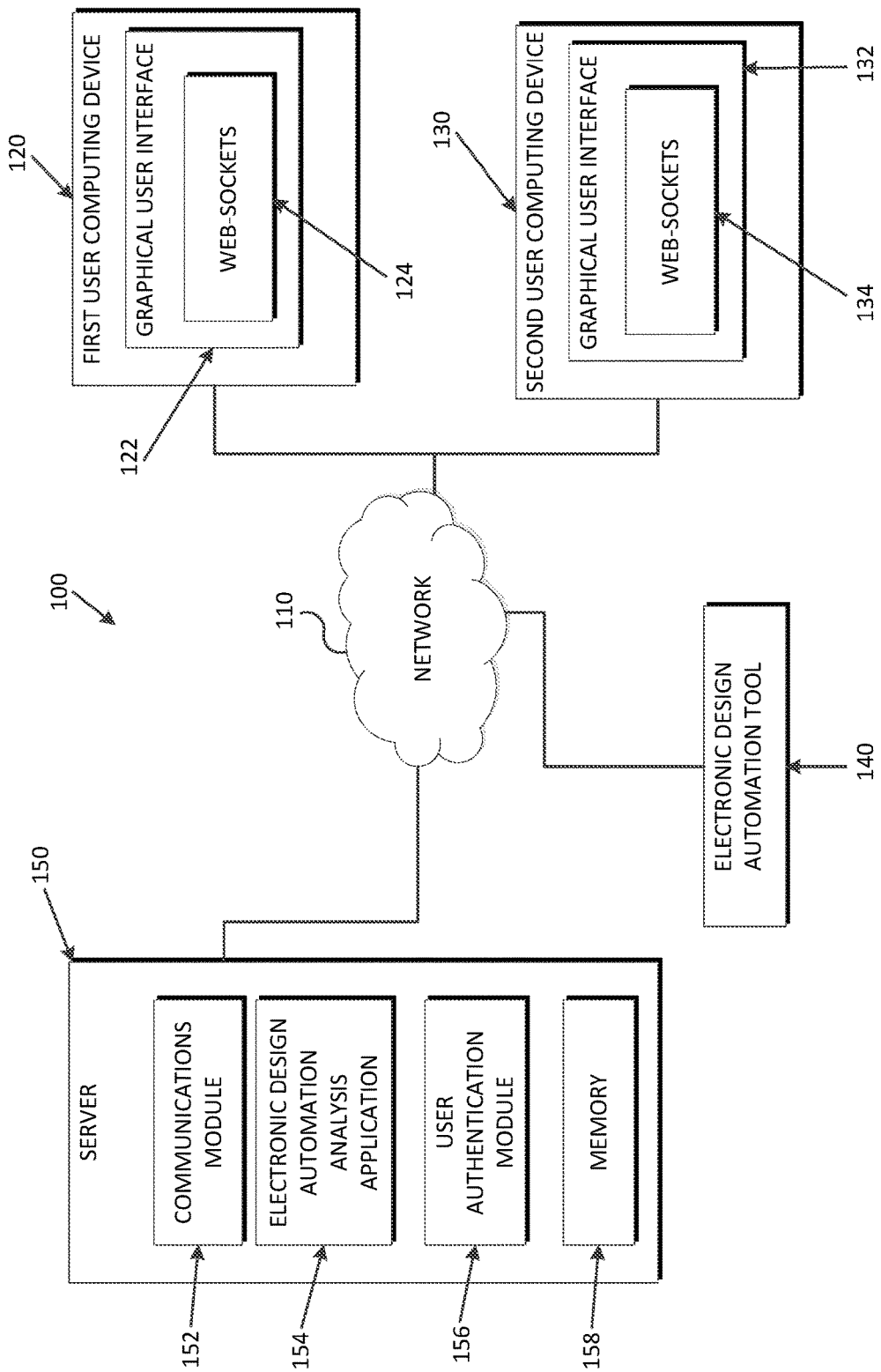
FIG. 1 is a functional block diagram illustrating a distributed electronic design automation (EDA) data processing environment, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to an electronic design automation data processing system. A plurality of user computing devices comprises a graphical user interface that includes the necessary web-sockets to access an electronic design automation (EDA) application stored on a server. The server allows for parallel access, thus allowing a plurality of users to simultaneously access the EDA application to analyze the data received from an electronic design automation (EDA) tool. The EDA tool takes readings/data/information from an object, for example, a semiconductor chip, and sends the data to the EDA application. The parallel communications is achieved by using the web-sockets to make a threaded or forked connection with the server to access the EDA application.

FIG. 1 is a functional block diagram illustrating a distributed electronic design automation (EDA) data processing environment 100, in accordance with an embodiment of the present invention. The EDA data processing environment 100 includes a first user computing device 120, a second user computing device 130, an EDA tool, and a server 150 that communication via a network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the first user computing device 120, the second user computing device 130, EDA tool 140, and server 150, in accordance with one or more embodiments of the invention.

The first user computing device 120 and the second user computing device 130 contain the same components and have the same functions. The first user computing device 120 and the second user computing device 130 represent a computing devices that include a user interface, for example, a graphical user interfaces 122 and 132. The graphical user interfaces 122 and 1132 can be any type of application that contains the necessary web-sockets 124, 134, to access the EDA analysis application 154 located the server 150, for example, the application can be a web application, a graphical application, an editing application or any other type of application/program that allows a user to upload, change, delete, alter, or update data accessible to the EDA analysis application 154. Furthermore, the web-sockets 124, 134 can be included within the communications module 152, instead on be included within the graphical user interfaces 122, 132.

The first user computing device 120 and second user computing device 130 may be any type of computing devices that are capable of connecting to network 110, for example, a laptop computer, tablet computer, netbook computer, personal computer (PC), a desktop computer, a smart phone, or any programmable electronic device supporting the functionality required by one or more embodiments of the invention. The first user computing device 120 and second user computing device 130 may include internal and external hardware components, as described in further detail below with respect to FIG. 4. In other embodiments, the server 150 may operate in a cloud computing environment, as described in further detail below with respect to FIGS. 5 and 6.

The web-sockets 124, 134, is designed to be implemented in web browsers and web servers, but it can be used by any client or server application. Web-sockets 124, 134 is an independent TCP-based protocol. Its only relationship to HTTP is that its handshake is interpreted by HTTP servers as an upgrade request. Web-sockets 124, 134 protocol enables interaction between a browser, graphical user interfaces 122, 132 and a server 150 with lower overheads, facilitating real-time data transfer from and to the server 150. This is made possible by providing a way for the server 150 to send content to the browser without being solicited by the client, the first user computing device 120 and the second user computing device 130, and allowing for messages to be passed back and forth while keeping the connection open. In this way, a two-way (bi-directional) ongoing conversation can take place between a browser, graphical user interfaces 122, 132 and the server 150.

The electronic design automation (EDA) tool 140 are used to analyze the state of the chip that is being designed. The EDA tool 140 can gather data on multiple functional domains like timing (chip frequency and functional correctness verification), noise (signal integrity), power (static, dynamic, peak, average), etc. The EDA tool 140 produces data by performing static and/or dynamic simulations based on the chip design. The EDA tool 140 is shown to be separate from server 150, but instead the EDA tool 140 could be contained within server 150.

The server 150 includes a communications module 152, an electronic design automation (EDA) analysis application 154, a user authentication module 156, and memory 158. The server 150 is able to communicate with the first user computing device 120 and the second user computing device 130, via network 110. Server 150 may include internal and external hardware components, as depicted and described in further detail below with reference to FIG. 4. In other embodiments, the server 150 may include internal and external hardware components, as depicted and described in further detail below with respect to FIG. 5, and operate in a cloud computing environment, as depicted in FIG. 6.

The communications module 152 establishes communication between the first user computing device 120, the second user computing device 130 and the server 150. The communications module 152 can include the web-sockets 124, 134, as described above. The communications module 152 establish a parallel communications between EDA analysis application 154 and the first user computing device 120, the second user computing device 130. The communications module 152 can establish the communications using either forked processing or threaded processing.

Threading and forking are two popular methods for parallel processing. In forking, separate child processes are created. Fork is a new process that looks exactly like the old or the parent process, but still it is a different process with a different process ID and having its own memory. The parent process creates a separate address space for a child process. Both parent and child process possess the same code segment, but execute independently from each other.

The simplest example of forking is when you run a command on shell in unix/linux. Each time a user issues a command, the shell forks a child process and the task is done. When a fork system call is issued, a copy of all the pages corresponding to the parent process is created, loaded into a separate memory location by the OS for the child process, but in certain cases, this is not needed. Like in 'exec' system calls, there is not a need to copy the parent process pages, as execv replaces the address space of the parent process itself.

In threading, the same process can create multiple threads to run in parallel. A thread of execution is the smallest sequence of programmed instructions that can be managed independently by a scheduler, which is typically a part of the operating system. The implementation of threads and processes differs between operating systems, but in most cases a thread is a component of a process. Multiple threads can exist within one process, executing concurrently and sharing resources such as memory, while different processes do not share these resources. In particular, the threads of a process share its executable code and the values of its variables at any given time.

Threads require less overhead than "forking" or spawning a new process because the system does not initialize a new system virtual memory space and environment for the process. While most effective on a multiprocessor system where the process flow can be scheduled to run on another processor thus gaining speed through parallel or distributed processing, gains are also found on uniprocessor systems which exploit latency in I/O and other system functions which may halt process execution.

The user authentication module 156 authenticates a user when they try to access the EDA analysis application 154.

The user authentication module 156 determines that the user is able to access the application and what type of access the user is allowed.

The memory 158 is a data store that stores data generated from the EDA tool 140 and any data that a user has accessed through the EDA analysis application 154. The memory 158 further stores any changes, notes, scripts, or any other user generated information with corresponding data.

The EDA analysis application 154 analysis the data collected by the EDA tool 140 and sends the data to the graphical user interfaces 122 and 132. The results depend on the underlying EDA analysis application 154. For instance, of it is a timing analysis, it could be the timing slacks (meaning, which parts of the logic are expected to fail their functional and performance criteria), their distribution, the paths leading to the timing fails, the attributes causing the failure, etc; if it is power analysis, it could be the overall power distribution for the chip, the peak power, the hot spots (meaning which parts of chip have a concentration of high power consuming logic) etc.

The graphical user interfaces 122 and 132 render the data through tables, charts, graphs, annotations, dynamic expansion etc. The graphical user interfaces 122 and 132 allow for the user to customize the way the data gets displayed to their screens. There are a number of visualization tools one can deploy such as tabular data, different types of plots such as scatter plot, histogram, trend lines, configurable widgets, coloring for ease of navigation, options to expand/collapse detailed info, etc. The graphical user interfaces 122 and 132 further allow for the user to generate scripts to be applied to the data, stored on the memory 158, which allow for the scripts to be accessed by multiple users. The parallel connection created by the communications module 152 allows for the user of each of the first user computing device 120 and the second user computing device 130 to view how the other user is interacting with the data.

The communications module 152 or the web-sockets 124, 134 use of the web-socket based protocol allows for designers to easily get access to the analysis results on their web server, without needing to log in to the server where the job was run from. Also, multiple users can access the same data at the same time, allowing for concurrent triage/fix-up, thus providing significant productivity improvements.

Figure 2:
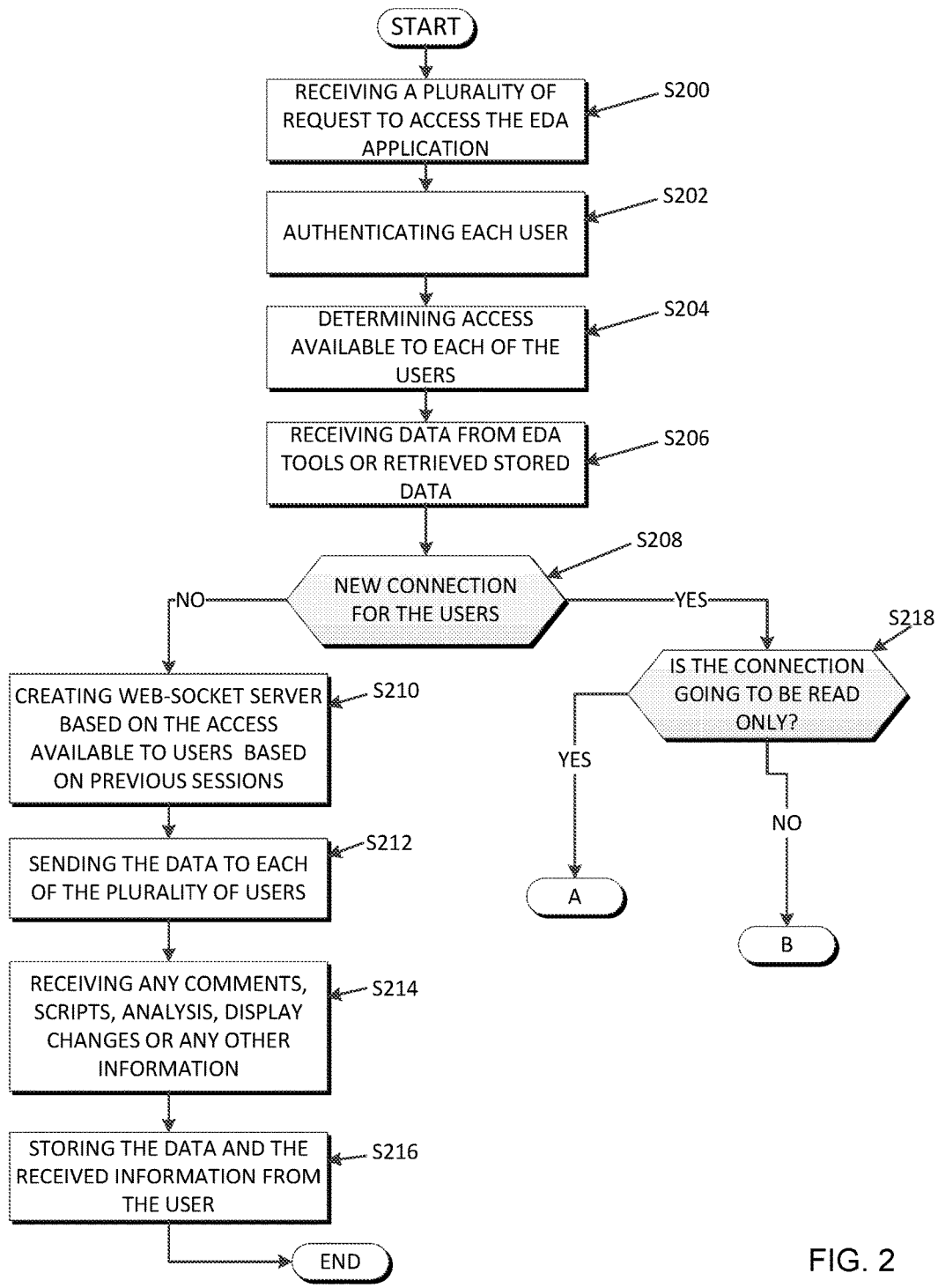
FIG. 2 is a flowchart depicting operational steps of the EDA application within the EDA data processing environment of FIG. 1, in accordance with an embodiment of the present invention.
Figures 3A, 3B:
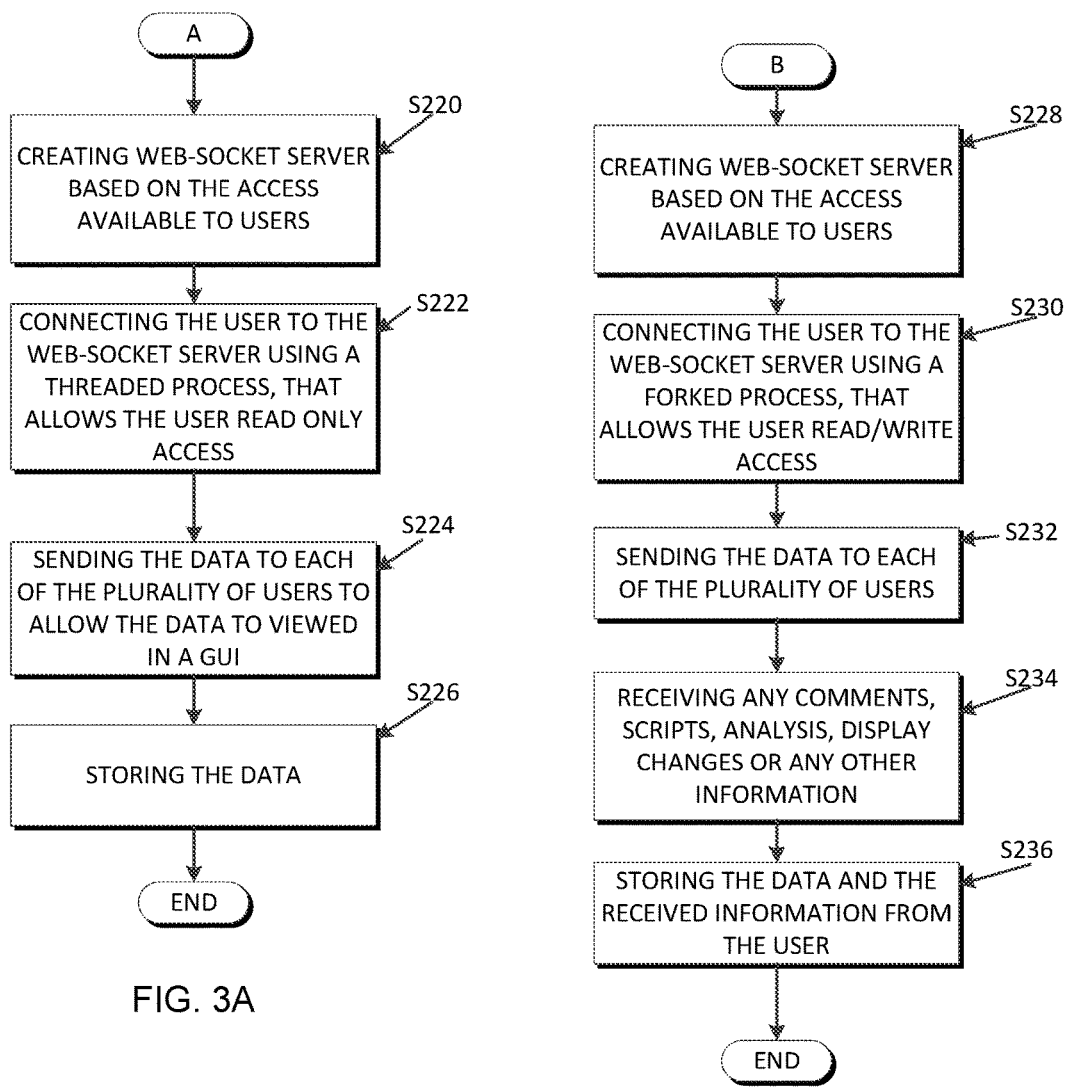
FIGS. 3A and 3B are a continuation of the flowchart depicting in FIG. 2, in accordance with an embodiment of the present invention.

FIG. 2 is a flowchart depicting operational steps of the EDA application within the EDA data processing environment of FIG. 1, in accordance with an embodiment of the present invention. FIGS. 3A and 3B are a continuation of the flowchart depicting in FIG. 2, in accordance with an embodiment of the present invention.

Communications module 152 receives a request to access the EDA analysis application 154 from the first user computing device 120 and the second user computing device 130 (S200). The user authentication module 156 authenticates each of the user's (S202) and determines what type of access is granted to each of the users (S204). The EDA analysis application 154 either receives new data from the EDA tool 140 or it retrieves data stored in the memory 158 (S206). The EDA analysis application 154 determines if the users have connected to the application before or if they are new users (S208). The communications module 152 and/or the web-sockets 124, 134 create a web-socket server to connect to the EDA analysis application 154 based on the users previous sessions with the EDA analysis application 154 (S210). The EDA analysis application 154 sends the data via the communications module 152 to each of the user to be displayed on the graphical user interfaces 122, 132 (S212). If the connection is not a read only connection then the EDA analysis application 154 receives any comments, scripts, analysis, display changes, or any other user generated information (S214). The EDA analysis application 154 stores the received information and the corresponding data in the memory 158 (S216). If the connection is considered a read only connection, then the EDA analysis application 154 stores only the data in the memory 158 (S216).

In response to determining if the users are new user connecting to the EDA analysis application (S208) then the EDA analysis application 154 determine if the user are going to be granted a read only connection (S218). The communications module 152 and/or the web-sockets 124, 134 create a web-socket server to connect to the EDA analysis application 154 based on the users determined read only access to the EDA analysis application 154 (S220). The communications module 152 connects the first user computing device 120 and the second user computing device using a thread process (S222) that allows the user to only view/read the data, via the graphical user interfaces 122, 132 (S224). The threaded processing connection allows the first user computing device 120 and the second user computing device 130 to be connected in parallel to the web-socket server, thus allowing for concurrent access to the data. The EDA analysis application 154 stores only the data in the memory 158 (S226).

In response to determining if the users are new user connecting to the EDA analysis application (S208) then the EDA analysis application 154 determine if the user are going to be granted a read/write connection (S218). The communications module 152 and/or the web-sockets 124, 134 create a web-socket server to connect to the EDA analysis application 154 based on the users determined read/write access to the EDA analysis application 154 (S228). The communications module 152 connects the first user computing device 120 and the second user computing device using a forked process (S230). The forked processing connection allows the first user computing device 120 and the second user computing device 130 to be connected in parallel to the web-socket server, thus allowing for concurrent access to the data. The EDA analysis application 154 sends the data to each of the users to allow them to view the data via the graphical user interfaces 122, 132 (S232). The graphical user interfaces 122, 132 concurrently allow for the users to comment, write scripts, analysis, display changes, or any other user generated information to the data. The EDA analysis application 154 receives any user generated comments, scripts, analysis, display changes, or any other user generated information (S234) to be stored with the corresponding data (S236).

Figure 4:
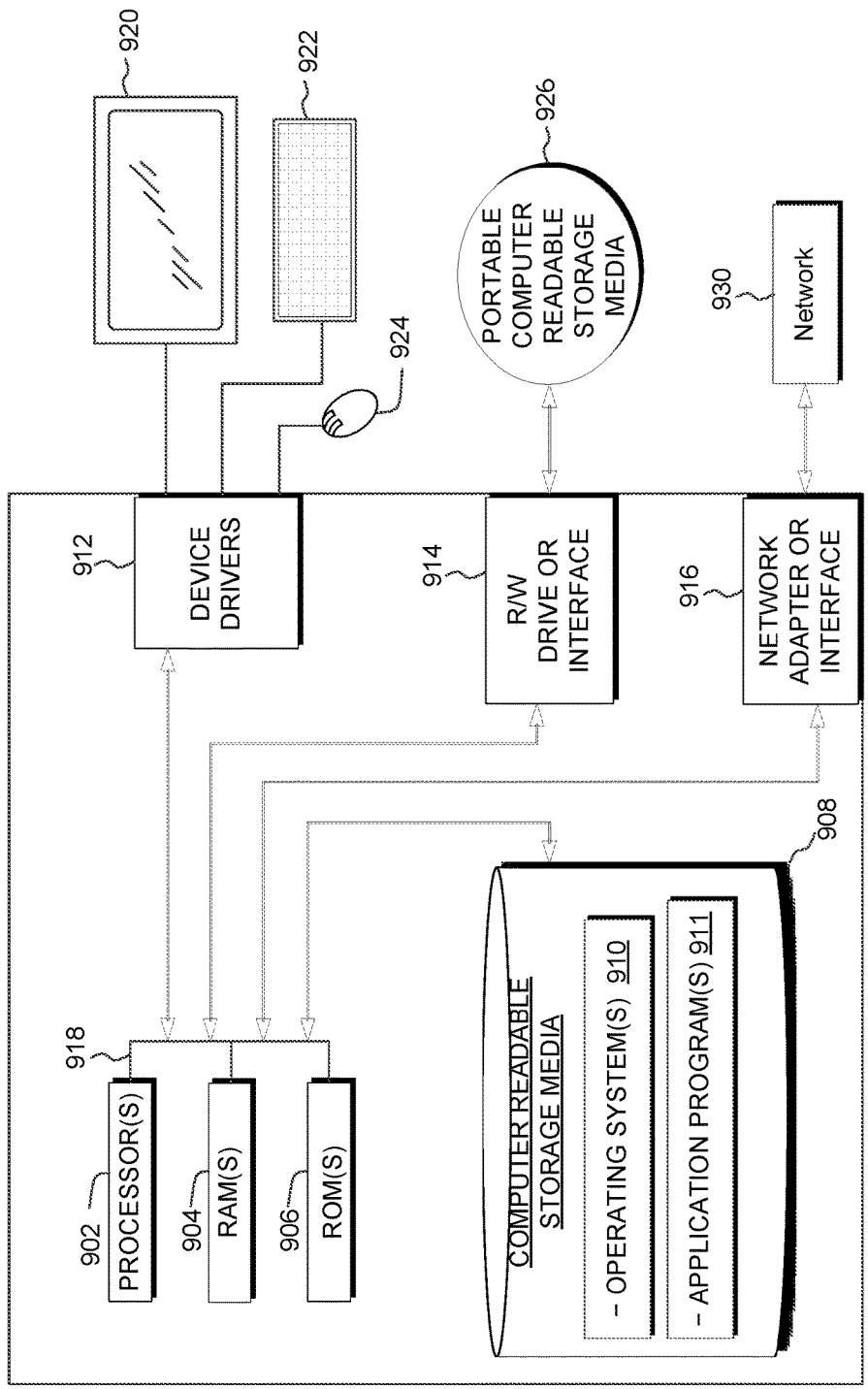
FIG. 4 is a block diagram of components of a computing device of the EDA data processing environment of FIG. 1, in accordance with embodiments of the present invention.

FIG. 4 depicts a block diagram of components of server 150 of a distributed electronic design automation (EDA) data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The first user computing device 120, the second user computing device 130 and/or server 150 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, EDA analysis application 154 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The first user computing device 120, the second user computing device 130 and/or server 150 may also include a R/W drive or interface 914 to read from and write to one or more portable computer readable storage media 926. Application programs 911 on the first user computing device 120, the second user computing device 130 and/or server 150 may be stored on one or more of the portable computer readable storage media 926, read via the respective R/W drive or interface 914 and loaded into the respective computer readable storage media 908.

The first user computing device 120, the second user computing device 130 and/or server 150 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the first user computing device 120, the second user computing device 130 and/or server 150 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The first user computing device 120, the second user computing device 130 and/or server 150 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
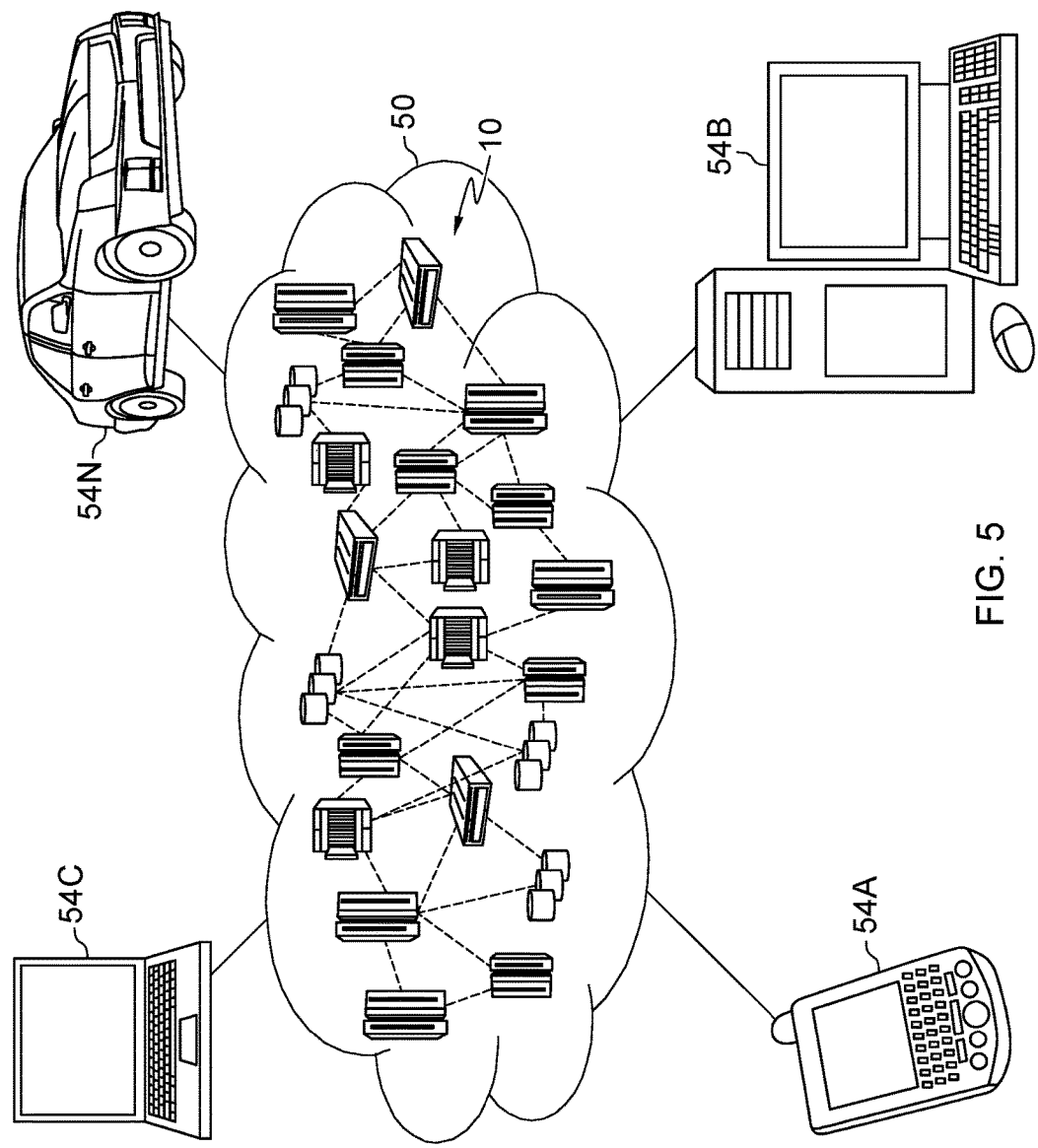
FIG. 5 depicts a cloud computing environment according to an embodiment of the present invention.
Figure 6:
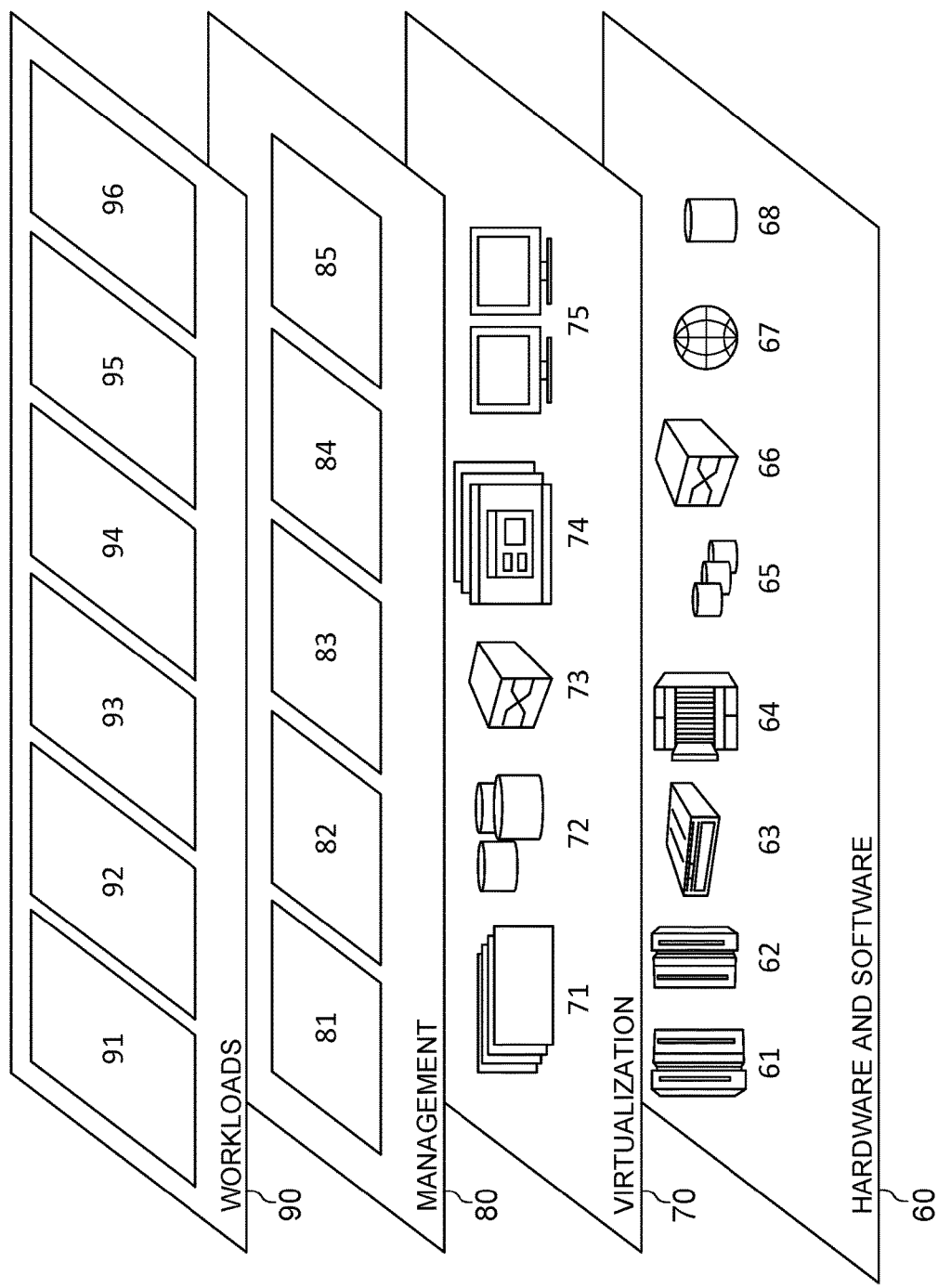
FIG. 6 depicts abstraction model layers according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and EDA analysis application 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method comprising:
  receiving, by a computer, a request to access an electronic design automation (EDA) application from at least two user computing devices;
  authenticating, by the computer, each user associated with each of the requests from the at least two user computing devices to access the EDA application;
  determining, by the computer, a level of access to be granted to each of the users of the at least two user computing devices;

creating, by the computer, parallel connections to each of the at least two user computing devices from the EDA application;

retrieving, by the computer, data to be transmitted to each of the at least two user computing devices, respectively; and storing, by the computer, the data in a memory unit, wherein the level of access to be granted to each of the users of the at least two user computing devices comprises either a read only access or a read/write access, and wherein in response to the each user of the at least two user computing devices being granted read only access, the created parallel connection is created using threaded processing.

2. The method of claim 1, further comprising:
determining, by the computer, that the users have previously connected to the EDA application;
wherein the created parallel connected is based on the type of connection between the users and the EDA application that was previously used.

3. The method of claim 1, wherein in response to the each user of the at least two user computing devices being granted read/write access, the created parallel connection is created using forked processing.

4. The method of claim 3, further comprising:
receiving, by the computer, user generated comments, analysis, scripts, and/or display changes related to the transmitted data; and
storing, by the computer, the user generated comments, analysis, scripts, and/or display changes, related to the data.

5. The method of claim 1, wherein the created parallel connection allows for each of the users to concurrently access the EDA application.

6. The method of claim 1, wherein the parallel connection allows for each user of the at least two user computing devices to view how the other users are interacting with the data.

7. A non-transitory computer program comprising:
one or more non-transitory computer-readable storage media and program instructions stored on the one or more non-transitory computer-readable storage media, the program instructions being executable by a processor to perform a method, the program instructions comprising:
receiving a request to access an electronic design automation (EDA) application from at least two user computing devices;
authenticating each user associated with each of the requests from the at least two user computing devices to access the EDA application;
determining a level of access to be granted to each of the users of the at least two user computing devices;
creating parallel connections to each of the at least two user computing devices from the EDA application;
retrieving data to be transmitted to each of the at least two user computing devices, respectively; and
storing the data in a memory unit, wherein the level of access to be granted to each of the users of the at least two user computing devices comprises either a read only access or a read/write access, and wherein in response to the each user of the at least two user computing devices being granted read only access, the created parallel connection is created using threaded processing.

8. The non-transitory computer program of claim 7, further comprising:
determining that the users have previously connected to the EDA application;
wherein the created parallel connected is based on the type of connection between the users and the EDA application that was previously used.

9. The non-transitory computer program of claim 7, wherein in response to the each user of the at least two user computing devices being granted read/write access, the created parallel connection is created using forked processing.

10. The non-transitory computer program of claim 9, further comprising:
receiving user generated comments, analysis, scripts, and/or display changes related to the transmitted data; and
storing the user generated comments, analysis, scripts, and/or display changes, related to the data.

11. The non-transitory computer program of claim 7, wherein the created parallel connection allows for each of the users to concurrently access the EDA application.

12. The non-transitory computer program of claim 7, wherein the parallel connection allows for each user of the at least two user computing devices to view how the other users are interacting with the data.

13. A computer system comprising:
one or more computer processors, one or more computer-readable storage media, and program instructions stored on one or more of the computer-readable storage media for execution by at least one of the one or more processors, the program instructions comprising:
receiving a request to access an electronic design automation (EDA) application from at least two user computing devices;
authenticating each user associated with each of the requests from the at least two user computing devices to access the EDA application;
determining a level of access to be granted to each of the users of the at least two user computing devices;
creating parallel connections to each of the at least two user computing devices from the EDA application;
retrieving data to be transmitted to each of the at least two user computing devices, respectively; and
storing the data in a memory unit, wherein the level of access to be granted to each of the users of the at least two user computing devices comprises either a read only access or a read/write access, and wherein in response to the each user of the at least two user computing devices being granted read only access, the created parallel connection is created using threaded processing.

14. The computer system of claim 13, wherein the created parallel connection allows for each of the users to concurrently access the EDA application.

15. The computer system of claim 13, wherein in response to the each user of the at least two user computing devices being granted read/write access, the created parallel connection is created using forked processing.

* * * * *